United States Patent [19]

Clark

[11] Patent Number: 5,309,212
[45] Date of Patent: May 3, 1994

[54] SCANNING RANGEFINDER WITH RANGE TO FREQUENCY CONVERSION

[75] Inventor: R. Robert Clark, Palo Alto, Calif.

[73] Assignee: Yaskawa Electric Corporation, Tokyo, Japan

[21] Appl. No.: 940,493

[22] Filed: Sep. 4, 1992

[51] Int. Cl.$^5$ .................. G01C 3/08; G01B 11/26; G02B 26/08
[52] U.S. Cl. ................................. 356/5; 356/141; 359/201; 359/211
[58] Field of Search ................. 356/5, 141, 152; 359/201, 211

[56] References Cited

U.S. PATENT DOCUMENTS

| | | |
|---|---|---|
| 3,649,123 | 3/1972 | Ulicki . |
| 3,730,628 | 5/1973 | Wolcott et al. . |
| 3,778,160 | 12/1973 | Wolcott . |
| 4,470,698 | 9/1984 | Green et al. ............ 356/152 |
| 4,693,597 | 9/1987 | Shiomi et al. . |
| 4,721,384 | 1/1988 | Dietrich et al. . |
| 4,895,440 | 1/1990 | Cain et al. ............... 356/5 |
| 5,006,721 | 4/1991 | Cameron et al. . |
| 5,098,185 | 3/1992 | Watanabe et al. ............ 356/5 |

OTHER PUBLICATIONS

"Laser Range Finding Sensor Robotics," by Clergeot et al., from ROVISEC-6, 1986.
"Cubic Precision Red Dot Visible Laser EDM," Survey Systems Division.
"Atlas 1000 Laser Rangefinder," Laser Atlanta.
"AutoRanger IIx," Cubic Precision.
"Laser Radar Range Imaging Sensor for Commercial Applications," by Wesolowicz et al., SPIE, vol. 783 Laser Radar II, 1987.
"Method for Industrial Robot Tracking and Navigation Based on Time-of-Flight Laser Rangefinding and the Position Sensitive Detection Technique," by Kostamovaara et al., SPIE, vol. 1010 Industrial Inspection, 1988.

*Primary Examiner*—Stephen C. Buczinski
*Attorney, Agent, or Firm*—Majestic, Parsons, Siebert & Hsue

[57] ABSTRACT

An optical scanning rangefinder has been developed that creates a depth map of its surroundings by scanning a beam of modulated, collimated light and observing reflections from proximate surfaces. The scanning system uses dual rotating prisms to deflect the transmitted beam and collect a portion of the reflected light, which is focused on a photodetector and converted to an electrical signal. This signal is amplified, AC coupled, and inverted. The inverted signal drives the modulator for the light source. When sufficient light is received by the detector, this sytem forms an oscillator, the frequency of which depends on the distance to the illuminated surface. This frequency can easily be measured to a high degree of accuracy, and the distance to the surface derived from it. The scanner achieves a field of view of 360 degrees horizontally by 52 degrees vertically.

24 Claims, 7 Drawing Sheets

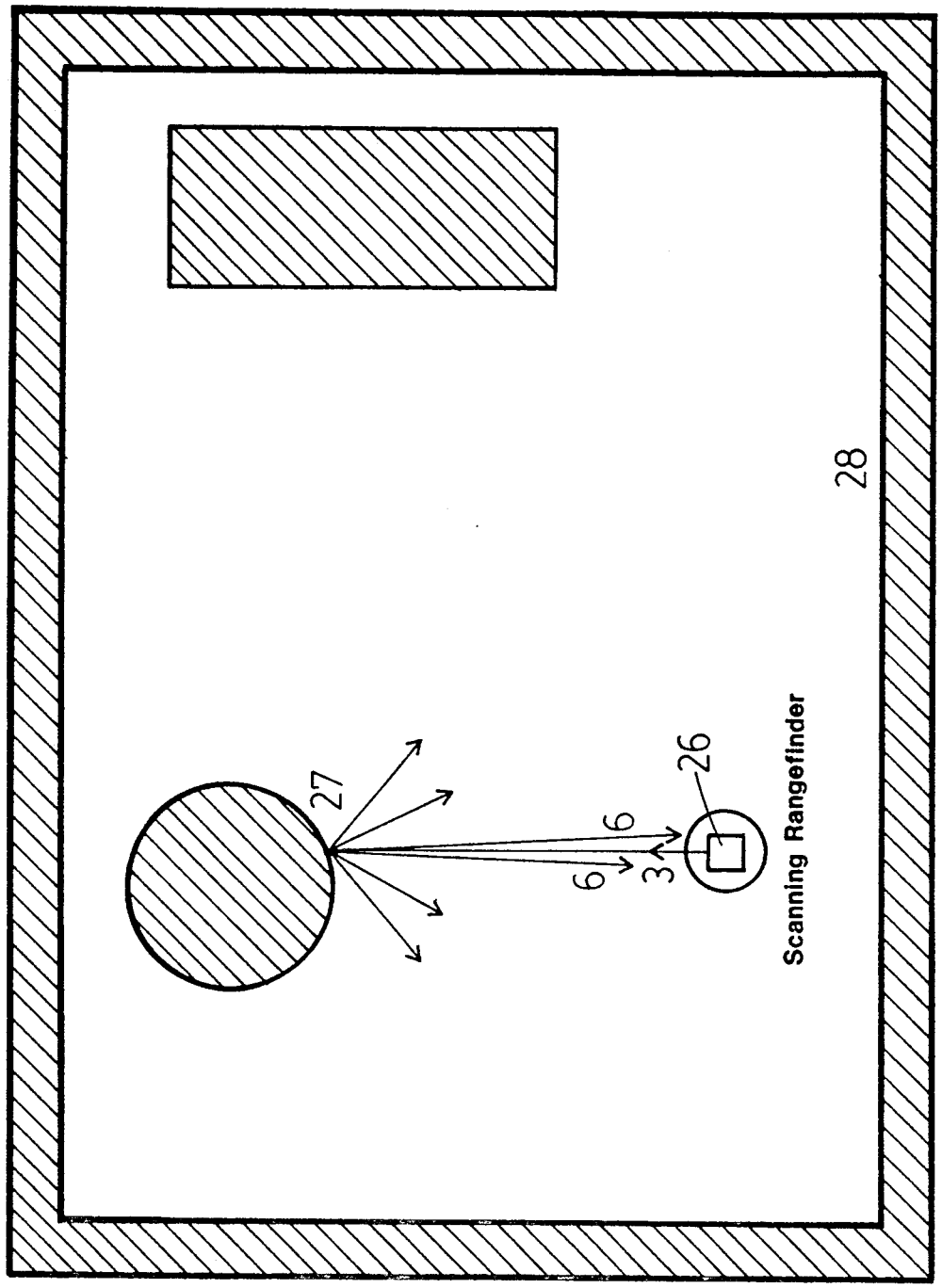
FIG._1.

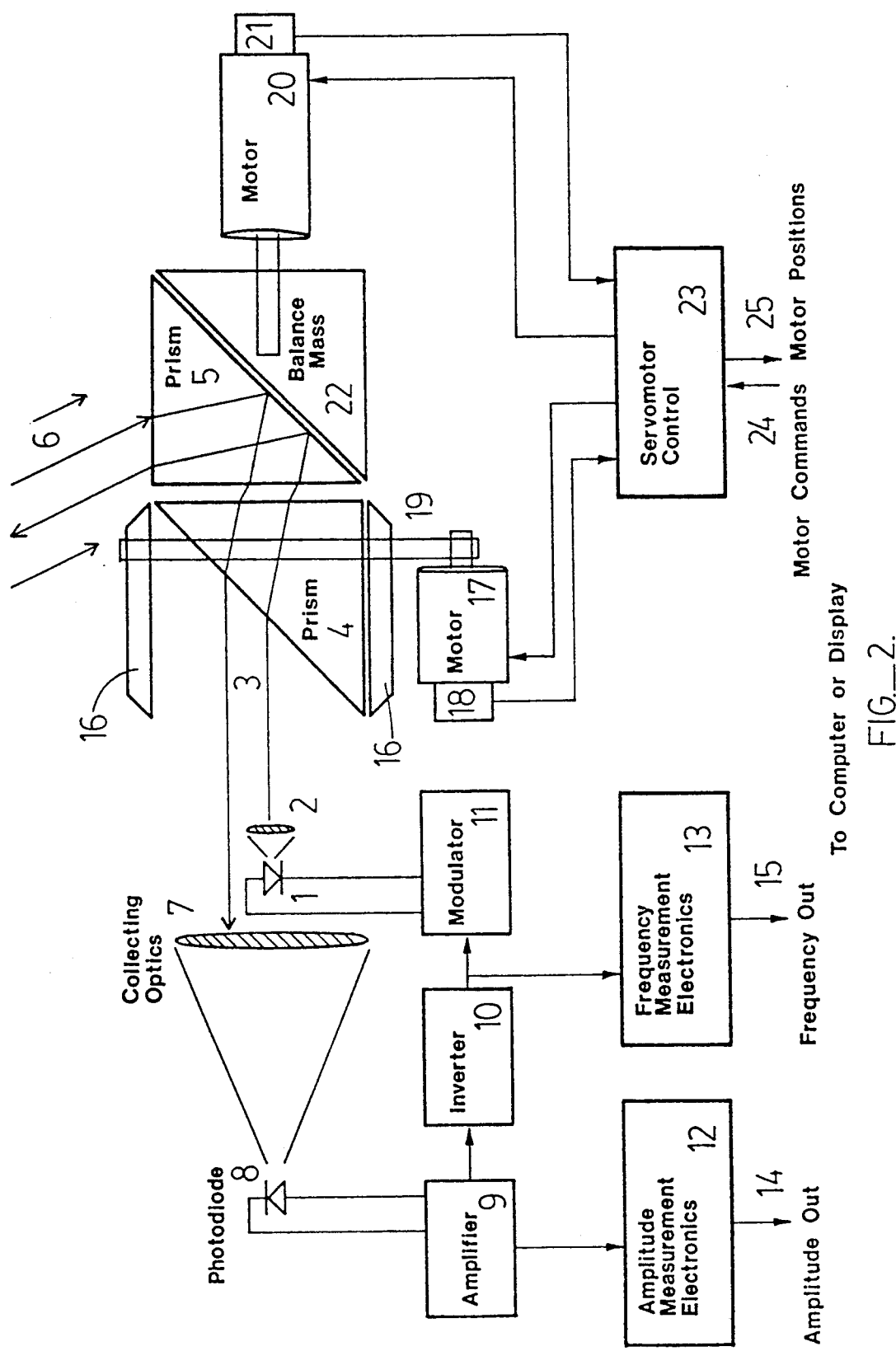
FIG._2.

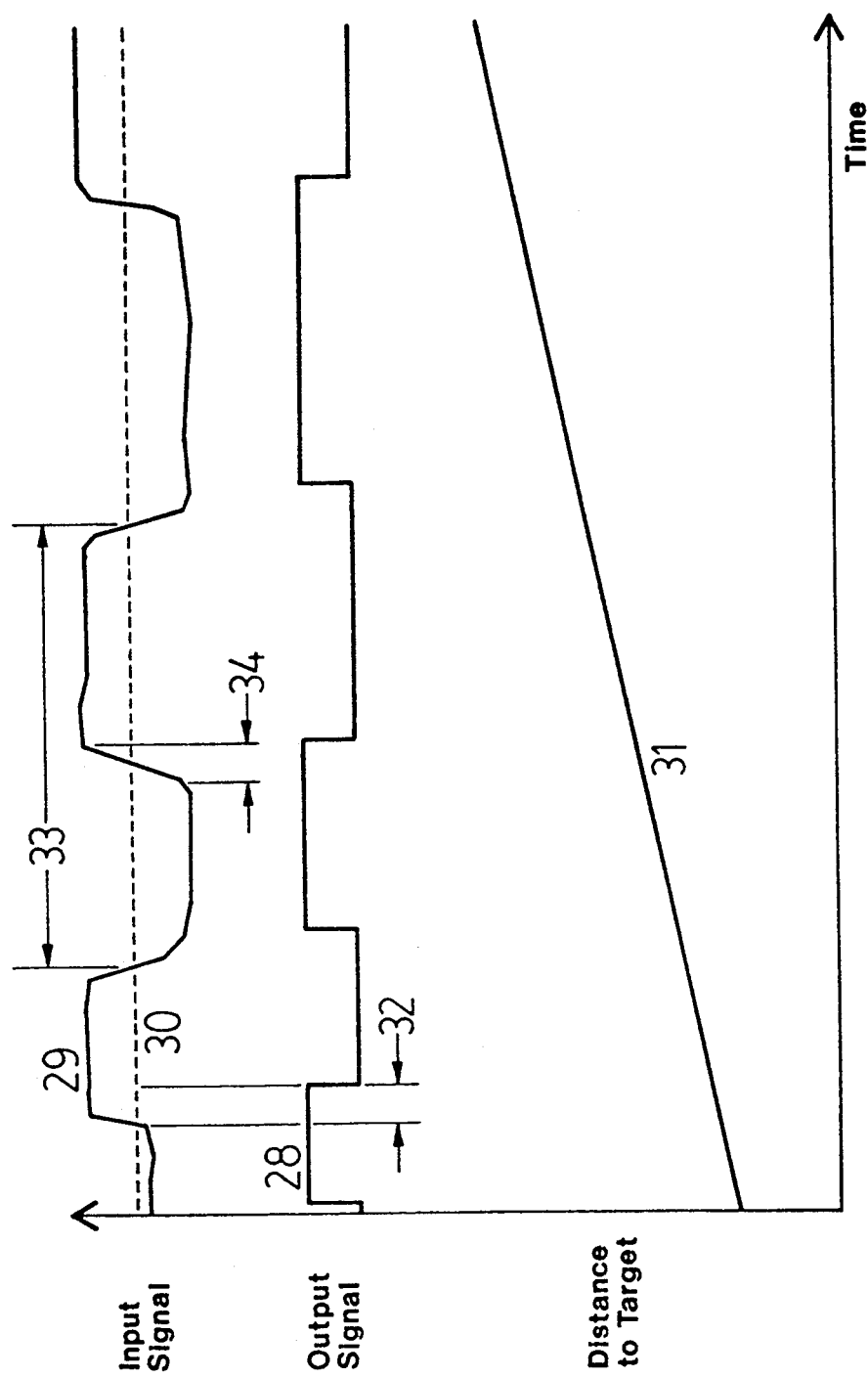
FIG._3.

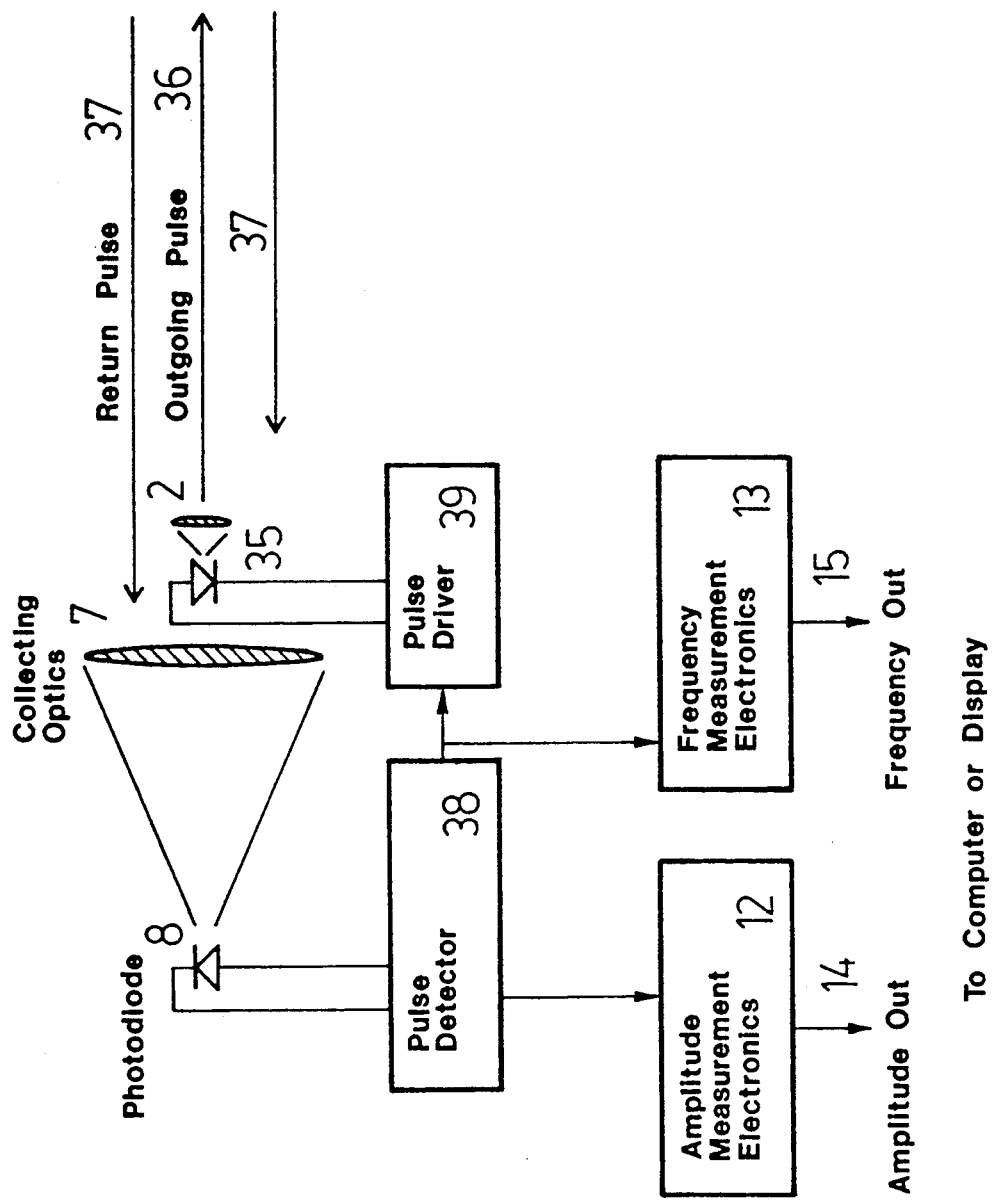
FIG._4.

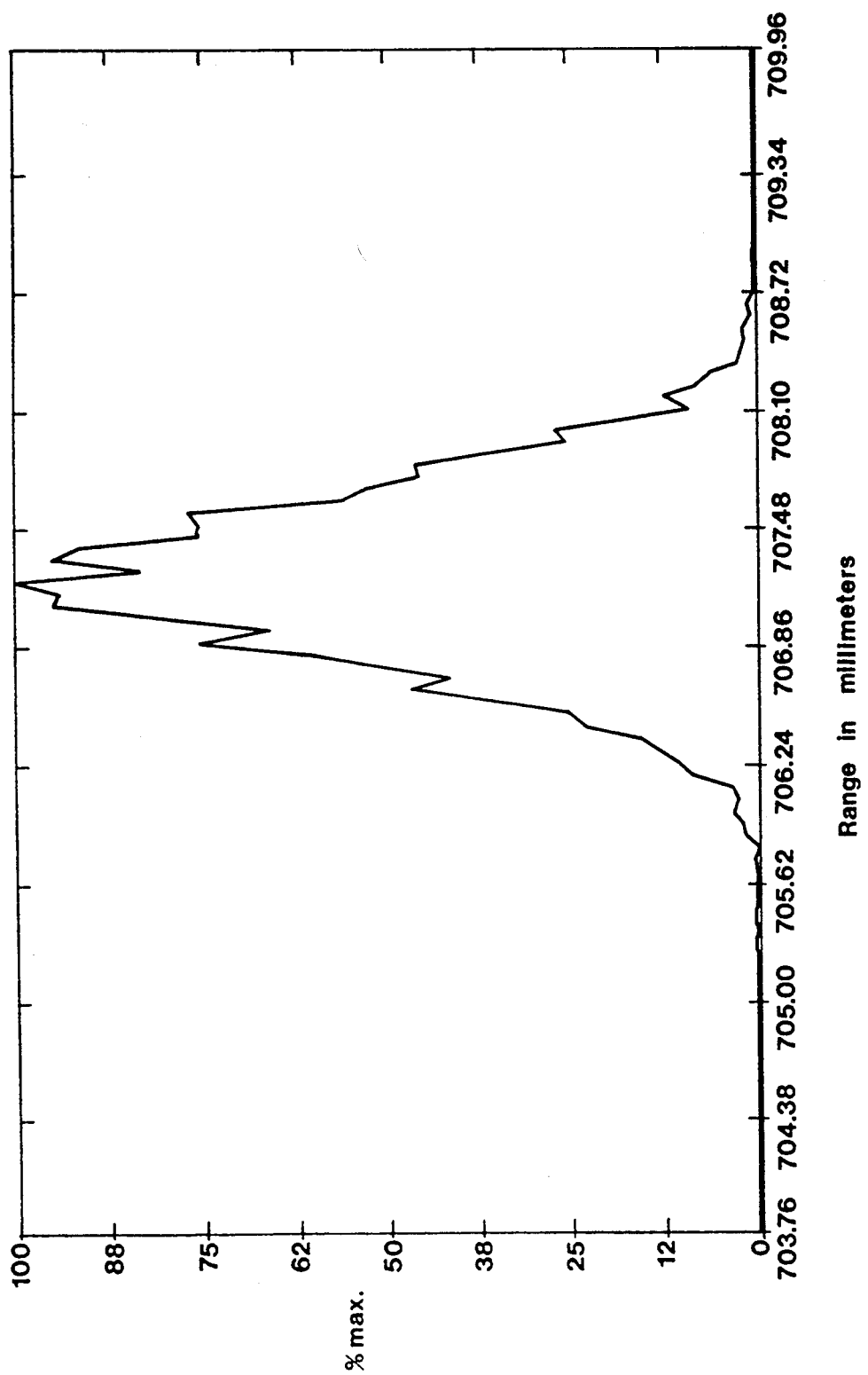
FIG._5.

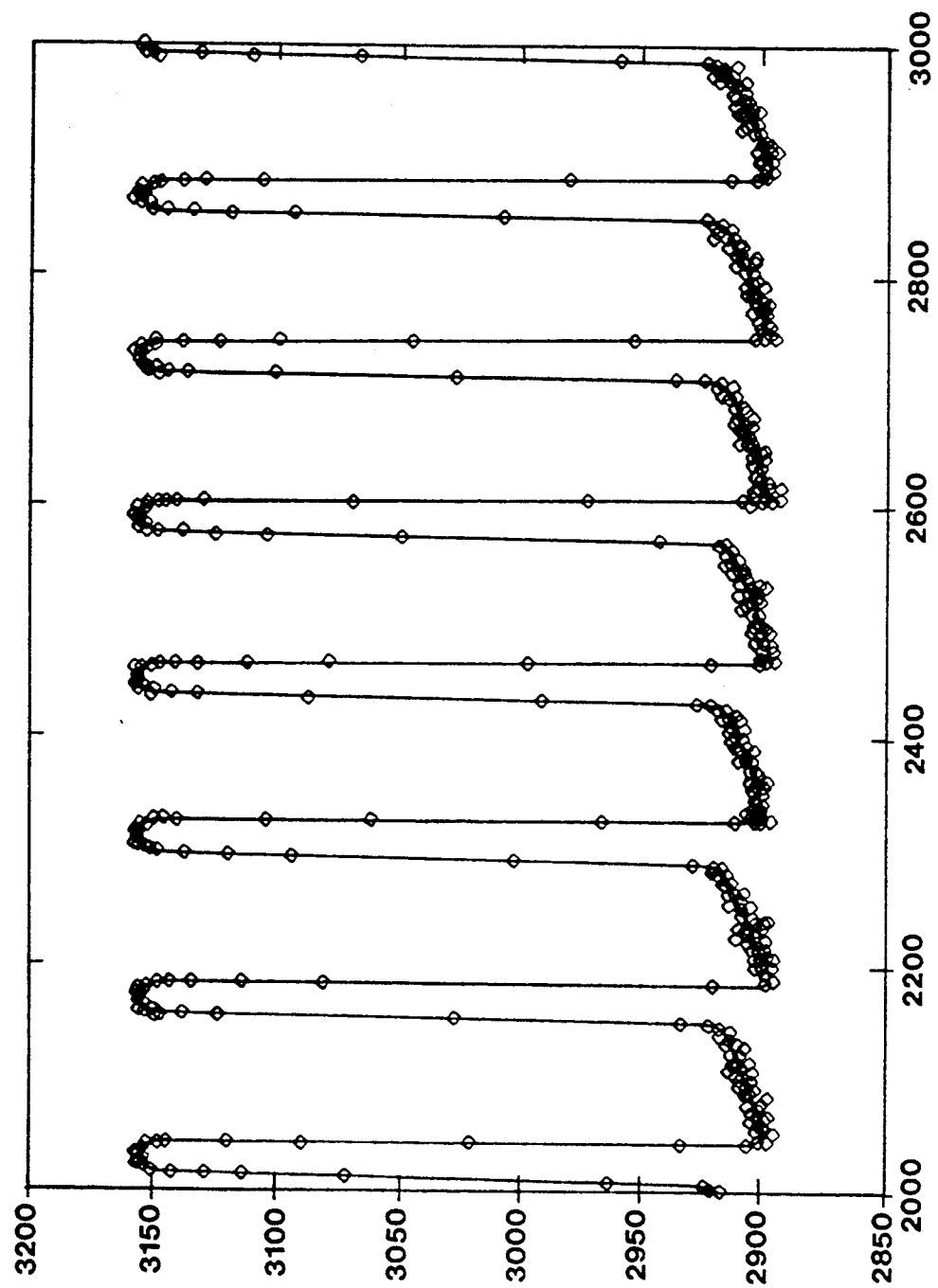
FIG._6.

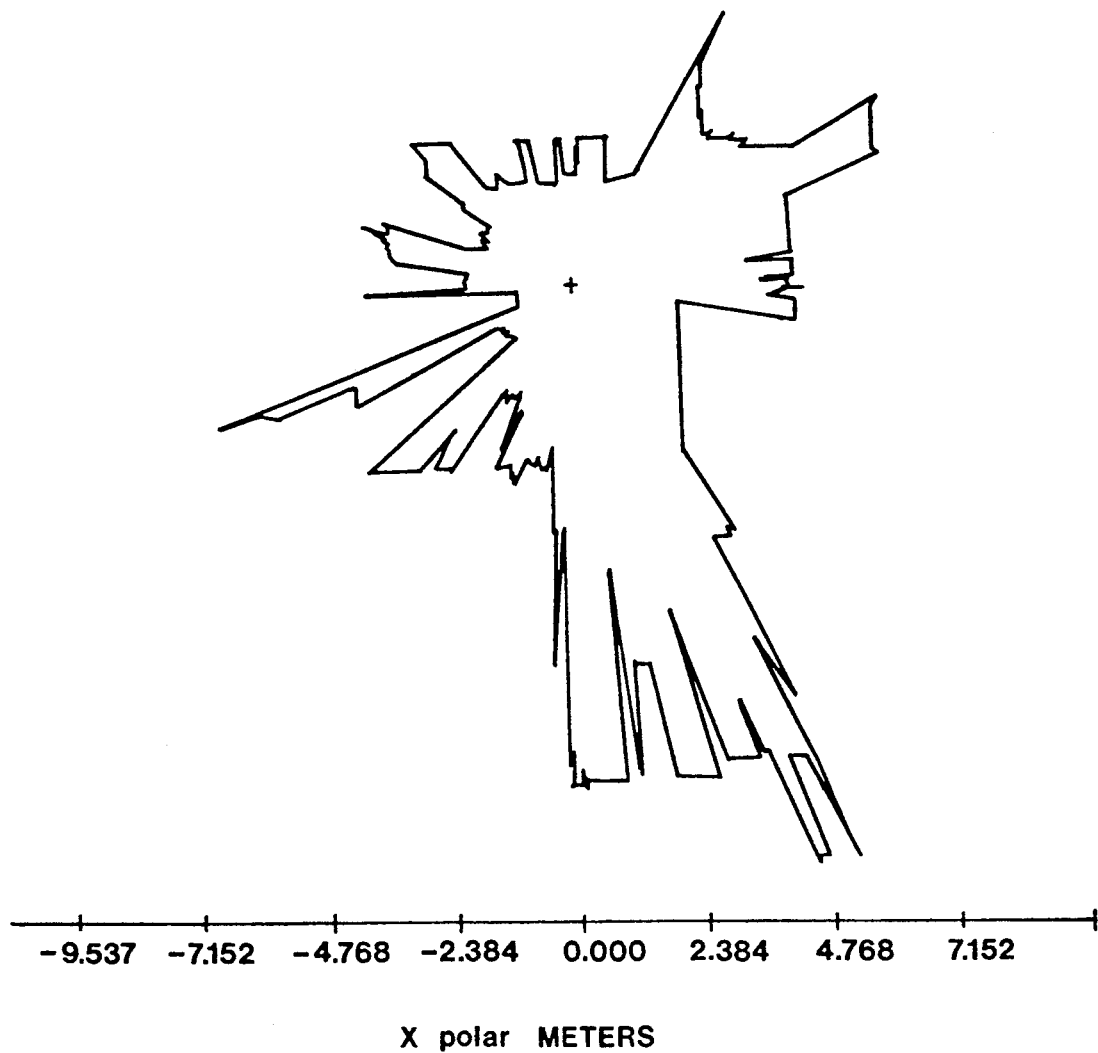
FIG._7

SCANNING RANGEFINDER WITH RANGE TO FREQUENCY CONVERSION

BACKGROUND OF THE INVENTION

This invention relates in general to techniques for distance measurements and in particular to a rangefinder with range to frequency conversion and method for using the rangefinder.

Several techniques for measuring distance with light signals are in common use today. They can be divided in two general categories, those that use the speed of light in some way to determine distance, and those that do not. The latter group usually uses a light projector located some distance from both the surface being lit and the detector. The detector then measures the direction of the light from both the surface being lit and the detector and triangulation is used to determine the surface's position. The accuracy of these systems depends on the separation distance between the emitter and detector, and typically works over a relatively narrow range of distances.

The distance measurement device disclosed here uses the speed of light as the basis for its distance measurement. It does this in a way that has not been used before and that provides several advantages to current techniques, as will be shown. Many of the problems of the currently used techniques described below are solved, and absolute distance is measured in a way that is potentially more accurate than either of these methods. As will be evident, this technique also has the ability to accomplish ranging at a lower cost than these systems.

There are several common methods of distance measurement based on the speed of light. The simplest of these is to emit a pulse of light and measure the time it takes for the reflected light to return to the detector, which is generally located close to the light source. The resolution is limited by the ability of the timing system used to discriminate small differences in time, and by factors such as the ability to determine the exact center of a return signal pulse which typically varies in amplitude. This method is suitable for measuring long distances, such as the distance to the moon, since the pulses can be of high power and detectable at long range.

Another method of deriving distance from the speed of light is to transmit an amplitude modulated light beam and to compare the phase of the return signal with the phase of the outgoing signal. The relative phase of the two signals depends on the distance to the subject and the frequency of the modulation used. The applications for this method are similar to the applications for the invention disclosed here.

The accuracy of the phase comparison method is limited by the ability of the phase detector used to resolve phase and the amount of isolation that can be obtained between the incoming and outgoing signals. Higher frequencies improve the resolution but worsen the crosstalk problem. This technique has been demonstrated to attain resolutions of 0.1 millimeters in the paper entitled "Laser Range Finding Sensor Robotics," by Clergeot et al. from ROVISEC-6, 1986. This method of ranging has the additional problem that the range reading aliases at range intervals equal to half the wavelength of the modulation. For example, with 50 MHz modulation (6 meter wavelength), it is not possible to distinguish between actual distances of n, n+3, n+6, ... meters, since all of them will result in the same detected phase difference. Multiple frequencies or some other technique must be used to resolve this ambiguity in many practical applications. U.S. Pat. No. 3,649,123 discloses a method of optical distance measurement that uses a phase-locked loop (PLL) to create an oscillation frequency dependent on the range to the target. The PLL approach requires phase detection electronics that are susceptible to the same sources of error as conventional phase measurement. The PLL electronics require a frequency synthesizer that is complex, expensive and susceptible to errors. The PLL approach requires significant time to lock on to the frequency corresponding to the distance to the target. This is a disadvantage when the target is moving rapidly or when the beam is scanned to measure the distances of different objects in the environment.

U.S. Pat. No. 5,006,721 describes a LIDAR scanning system that uses phase angle detection to measure the distance to objects, and moving mirrors to deflect the beam and collect reflected light. The device in that patent uses separate transmit and receive optics to reduce the crosstalk. The patent describes the resultant problem of parallax, a well as the problem of phase ambiguity, both of which limit the depth of field of that device.

None of the above described systems is entirely satisfactory. It is therefore desirable to provide a distance measurement system in which the above described difficulties encountered by the above described systems are alleviated.

SUMMARY OF THE INVENTION

The present invention generates a frequency based on range, but in a way that has several advantages Over the PLL technique of U.S. Pat. No. 3,649,123. The principle used in this invention is the measurement of distance by creating an oscillator with a source of projected energy and a sensor to detect this energy after it has travelled some distance. The invention also employs a scanning apparatus that rotates prisms to obtain a wider field of view than the use of mirrors as will be shown.

Both the crosstalk problem and the range ambiguity problem plaguing phase comparison methods are absent in the ranging method of this invention, and the frequency-based measurement technique used is of much higher resolution than phase measurement can be since timers are more accurate than phase detectors.

The detected signal is amplified and applied to the energy source to form a feedback loop which oscillates at a frequency that depends on the distance the energy travels and the speed at which it travels. The frequency can be measured, and either distance or speed determined if the other is known. The feedback loop gain may be negative and controlled to form a continuous oscillation in order to induce continuous oscillations, as it is in the preferred embodiment, or the loop may be closed with repeated pulses of energy. The emitter and sensor may be collocated, or they may be separated by some distance, and the energy may be reflected off a target or transmitted directly from emitter to sensor, and the distance between them measured.

By measuring the time required for multiple oscillations of this type of system, the distance (or speed) can be measured more accurately than if a single pulse of energy is timed. This is particularly true if light is used, since the speed of light and short times involved limit the resolution of the single pulse approach. Other energy sources and signal processing may also be used, such as those for ultrasound, radio waves or microwaves.

In one embodiment of the current invention, transmitted light is switched between two constant levels, referred to as the "on" and "off" states, when the input signal crosses a threshold which is the average of the "on" and "off" states. This has several advantages over the continuous sinusoidal waveform used in phase measurement systems. The problem of crosstalk is effectively eliminated, since the incoming signal generates the outgoing signal and, once the signal level is switched, a static condition is maintained in the electronics. Sensitivity to random noise is reduced, since small fluctuations in the incoming signal will not cause a transition of the output state. For the same reason, this method is more immune to errors induced by small return signals such as those from dust particles in the beam path than the phase measurement technique. When multiple reflections from several ranges are received by a system using a sinusoidal waveform, the resultant wave is the sum of all the reflections. With the binary switching technique, small reflections do not cause the device to switch, and the strongest signal controls the rate of oscillation.

The binary technique used in the present invention has the advantages of noise immunity and the use of detection and laser modulation circuits made common and inexpensive by the optical communications industry, which uses binary optical modulation. The optics and the modulation technique used in the present invention do not manifest the problems of parallax, allowing a minimum range of zero distance and maximum range limited only by the power of the light source and the reflectivity of the target.

One aspect of the invention is directed towards a system for measuring distance of an object comprising a source for transmitting a measurement signal, a detector that generates an output signal in response to said measurement signal or a reflection thereof from an object, a means responsive to the detector output signal for causing the source to transmit another measurement signal or modulating the amplitude of the measurement signal transmitted by the source, thereby generating periodic modulation of the measurement signal. The system further comprises means for detecting the period of the modulation of the measurement signal.

Another aspect of the invention is directed towards a method for measuring distance of an object comprising transmitting a measurement signal, generating an output signal in response to said measurement signal or a reflection thereof from an object, and causing another measurement signal to be transmitted or modulating the amplitude of the measurement signal transmitted in response to the output signal, thereby generating periodic modulation of the measurement signal. The method further comprises detecting the period of the modulation of the measurement signal.

Yet another aspect of the invention is directed to a scanning system that uses optical measurement signals and achieves a wider field of view than existing systems by using rotating prisms rather than mirrors. The system comprises a source for transmitting an optical measurement signal; prism means for altering the direction of the optical measurement signal; and means for moving the prism means so that the measurement signal is transmitted and reflected from different objects in different directions spanning objects in a field of view. The system further includes a detector that detects said measurement signal or reflections thereof from objects.

In the preferred embodiment of the scanning system, the same deflection optics are used for the transmitted and returning light, simplifying the overall design and reducing alignment problems. The problem of back reflections from the prisms entering the collection optics and contaminating the signal that is described in U.S. Pat. No. 5,006,721 is solved by the arrangement of the optics in the current invention.

BRIEF DESCRIPTION OF THE DRAWINGS

FIG. 1 shows the scanning rangefinder 26 in an enclosed area 28 with other objects to illustrate the preferred embodiment of the invention.

FIG. 2 is a schematic diagram of the rangefinder and the light paths through its optical components and detection and triggering circuits to illustrate the preferred embodiment of the invention.

FIG. 3 is a graph of sample input and output optical signals received by and generated by the rangefinder to illustrate the preferred embodiment of the invention.

FIG. 4 is a schematic diagram of a rangefinder and light paths through its optical components and detection and triggering circuits to illustrate an alternative embodiment of the invention.

FIG. 5 is a graphical illustration of the measurements taken using the rangefinder of FIG. 1 when it is set up about 9.5 meters from a wall and about 14,000 measurements taken, where the smooth nature of the distribution and the lack of outliers and the data sample demonstrates the reliability of the measurement system.

FIG. 6 is a graphical illustration of the output optical signals generated by the rangefinder of FIG. 1 when a rangefinder is used to detect the distance to the blades of a spinning fan to demonstrate the dynamic response of the rangefinder and its ability to make range measurements on moving objects.

FIG. 7 is a graphical illustration of the output optical signals generated by the rangefinder of FIG. 1 when the rangefinder was mounted on a mobile platform in a laboratory room and rotated through a full circle, taking measurements of the laboratory room around it, where the graph illustrates the profile of the room and objects inside the room to demonstrate the ability of the rangefinder to obtain range measurements from a variety of surfaces at a variety of angles of incidence.

DETAILED DESCRIPTION OF THE PREFERRED EMBODIMENT

FIG. 1 shows the scanning rangefinder 26 in an enclosed area 28 with other objects to illustrate the preferred embodiment. The rangefinder sends out a collimated beam of light 3 which reflects off its point of impact 27 with an object in the field of view. A portion of the reflected light 6 returns to the rangefinder and is collected by it. The beam is typically deflected in many directions having both horizontal and vertical components, covering an area in all directions around the rangefinder.

FIG. 2 is a diagram of the rangefinder and the light paths through its optical components, and of the detecting and triggering circuit to illustrate the preferred embodiment. It includes the light source 1, collimating optics 2, and prisms 4 and 5, each of which is rotated by a motor (17 and 20). Collecting optics 7 focus return light 6 onto photodiode 8. The signal path from the photodiode 8 includes an amplifier 9, and inverter 10, and a modulator 11 that drives the light source 1. Also included are amplitude and frequency measurement electronics 12 and 13, and motor control electronics 23. Output includes an amplitude signal 14, a measurement of the frequency 15 of oscillation indicating the distance to the target, and motor position data.

FIG. 3 is a graph of sample input and output optical signals received by and generated by the rangefinder. The input signal represents the light 6 received by the photodiode 8 as a function of time. The output signal represents the light transmitted by the source 1 as a function of time, and the distance 31 to target represents the range, increasing with time to the point of reflection 27. The time scale will vary with the electronics used in a particular implementation of the rangefinder, but is typically less than 1 microsecond for this figure. In this representation, the distance to target is increasing more rapidly than is typical, so that the change in oscillation frequency with distance may be shown.

Referring to FIG. 2, a light source is controlled by a modulator 11 to produce light that is one of two possible intensities, the greater "on" intensity typically being at least several times that of the lesser "off." The source may be a laser diode or a light emitting diode, or another device capable of producing switched output. The source is preferably switched with a short transition time. The light from the source is collimated into a beam 3 by collimating optics 2, which may also have beam circularizing optics to remove astigmatism such as is present with laser diodes. The source and collimating optics may be mounted on the optical axis of the collecting optics 7, or they may be mounted remotely and a small mirror used to direct beam 3 through prisms 4 and 5. In other words, prisms 4 and 5 are placed on the optical axis of the optical system where the axis of rotation also coincides with the paths of beams 3 and 6.

The collimated beam then passes into refracting prism 4, where it is refracted by an angle such as 26° before entering one leg of prism 5. It is then reflected from the hypotenuse of prism 5 and exits from the opposite leg. Prisms 4 and 5 are preferably made of a lightweight material such as plastic. They may be right angle prisms or they may be of other angles, depending on the desired field of view and orientation of the scanning beam. Prism 4 is held by a circular holder 16 which is mounted on bearings and driven by motor 17 via belt 19. The axis of rotation of both prisms is preferably the same as the optical axis of the transmitted light beam. Holder 16 is preferably formed to balance any off-center mass of prism 4 so that it may be rotated at high speed.

Prism 4 is preferably located close to collimating optics 2 and light source 1, so that stray reflections from the surfaces of prisms 4 and 5 returning parallel to beam 3 are blocked by them. Prisms 4 and 5 are preferably located close together so that the beam 3 enters prism 4 close to the center of its face. Prism 5 is attached to balance mass 22. Together they form a statically and dynamically balanced load. Both may be rotated by motor 20 via direct drive or another type of coupling, such as a belt drive.

The positions of motor 17 and prism 4, as well as motor 20 and prism 5, are detected by encoders 18 and 21. Servo control electronics 23 controls the positions of the motors. These electronics may be self-contained or be commanded by a processor or other controller that may set the speeds of the motors. The actual positions 25 of the motor may be read by such a processor, as may the frequency and the amplitude of the signal from blocks 12, 13.

As prism 4 is rotated, beam 3 traces a cone. If prism 4 is a right prism with an index of refraction of 1.51, the half angle of the cone is 26°. As prism 5 is rotated, this cone is swept through 360°. If prism 5 rotates more rapidly than prism 4, the elevation of beam 3 is varied by prism 4 as it is swept through 360° by prism 5.

Light beam 3 is partially reflected from a target point 27 and returns to the rangefinder as light beam 6. This light traces a path parallel to that of beam 3 through prisms 5 and 4. While a small amount is blocked by the source or source mirror, most enters the collimating optics 7 and is focused on the sensor 8, which may be one of several types of photodiode or other detector having a fast response time.

One of the most difficult aspects of the design of a scanning/light collection system is obtaining a large field of view while collecting light over a large collection area. The arrangement of prisms used in this invention gives a field of view of 360 degrees in one dimension by 52 degrees in the other. There are several aspects to this arrangement that are important in obtaining this field of view. First, prism 4 refracts the light passing through it rather than reflecting the light from a mirror. This allows prism 5 to be mounted close to prism 4, with the same axis of rotation, placing prism 5 close to the point at which the light path is bent by prism 4 without mechanical interference between the prisms. This reduces the size required for prism 5, given that it is desirable to collect a maximal amount of return light and direct it back through prism 4.

Prism 5 has a mirrored hypotenuse and outgoing and return light is reflected from it, bending the light path 90 degrees. There are two reasons that a prism is preferable to a simple mirror for this purpose. First, light entering prism 5 is bent toward the normal to the prism face. This reduces the deflection caused by prism 4 and consequently reduced the size of the mirrored surface required to capture a large amount of the return light. Light leaving prism 5 is deflected away from the normal, restoring the refraction of prism 4 and giving a wide field of view. This applies to both the outgoing and return paths. The second advantage to prism 5 is that the refraction toward the normal inside prism 5 keeps the light path clear of prism 4 when the direction of view is angled back toward prism 4. The use of a prism also affords optical rigidity while spinning at high speeds.

Another aspect of this configuration is the use of the same optical component for the outgoing and return light beams. This means that alignment of the prisms is not critical and as a result, system cost and complexity are reduced.

Amplifier 9 amplifies the signal 29 from sensor 8. It may also measure the amplitude of the signal or the amplitude may be measured in separate electronics 12. In the preferred embodiment, the amplified signal may be inverted during one of the amplification stages or it may be inverted separately by inverter 10. The resultant signal 28 is a logic level "1" or "0," and is input to modulator 11 which drives the source 1. The amplification and inversion logic is such that when light above an average threshold level 30 is falling on the detector 8, the source is switched off, and when the detected light falls below the average level, the source is switched on. The average threshold level is dependent on the characteristics of the amplifier as well as other components in the optical and electrical signal path, and may be adjusted in a manner known to those skilled in the art.

When operation begins, the source 1 may be on or off. The sensor 8 and its amplifier 9 generate small signals from random noise, which at some point switches the source to an opposite state. This transition, or edge, leaves the source and is reflected off the target back to the sensor, where it is amplified and causes an opposite transition of the source. This transition in turn is seen by the sensor and the cycle repeats continuously. Thus no starting or drive logic is necessary for oscillation to begin or continue.

The period of oscillation 33 of the system depends on the distance to the target 31, the propagation speed, and the delay 32 in propagating the signal from the detector to the emitter. If light from the source 1 is reflected from a remote target using a collocated sensor 8 and source 1 in a negative feedback system, one round trip delay constitutes half of a cycle and the cycle period can be expressed as:

$$P = 2 \cdot Te + 4 \cdot D/C \qquad (1)$$

where P is the period of oscillation, Te is the propagation time 32 through the electronics from the sensor to the light source, D is the distance from the rangefinder to the target, and C is the speed of light. If one uses a timing device in conjunction with a counter to measure N cycles of operation and the measured time is $T = N \cdot P$, the distance D to the target is given by:

$$D = C \cdot (T - N \cdot 2Te))/(4 \cdot N). \qquad (2)$$

If the frequency measurement electronics 13 can measure time to a certain minimum time increment, the resolution of the distance is proportional to the number of cycles timed. Thus, the resolution of the distance can be improved by increasing the number of cycles counted. Crystal clocks have finite resolution but are accurate over long times, allowing high resolution and accuracy if a large number of cycles is timed. The larger the number of cycles used, the longer a measurement takes, so there is a trade-off between sample rate and resolution. Timers can be accurate to one part in 10 billion, so extremely high-resolution measurements can be taken.

The signal to the modulator 11 is also used as the input to frequency measurement circuitry 13 which measures the period of these oscillations. This may be done by counting a fixed number of cycles and timing the interval taken. If the timer resolution is 33.3 nanoseconds and a selectable number of cycles such as 2048 is timed, then since light travels 29.98 cm in 1 nanosecond, the resolution of the system is (29.98*33.3)/(4*2048), or 0.122 cm. This resolution would be obtained at a sample rate of 3,662 measurements per second. The sample rate may be varied with a corresponding change in resolution, by counting more or fewer cycles, as desired. A system with a faster timer clock would yield higher sample rates and higher resolution.

The time that the timer measures may be stored in a buffer and read by a computer system or small processor/display combination. This computer may convert the time to a distance using equation (1) above. The value for the propagation delay though the electronics may be obtained during a calibration process, with compensation for amplitude and frequency effects on the measurement included in the calibration data.

CONSIDERATIONS FOR MEASUREMENT ACCURACY

There are two factors which affect the accuracy of this distance measurement technique, which also affect any range measurement system. The first is random noise, and the second is systematic error. Random noise comes from several sources, such as thermal noise in the detector and external fluctuations in ambient light. There are several ways to reduce the effect of random noise on measurements, and they are typical of most instrumentation systems. These include filtering the light and electronic signals, increasing the power level of the transmitted light or the amount of light collected for the detector, and using cryogenically or thermoelectrically cooled detectors. The effect of random or white noise is to increase the standard deviation of the measurement error. This can be reduced by averaging several measurements or taking a measurement over a long time period (many cycles), effectively averaging within one sample. The variance of the absolute time error caused by noise is proportional to the square root of the total measurement time, and the error as a percentage of the time is inversely proportional to the square root of the time.

The preferred embodiment of the invention uses "on" and "off" levels in its operation rather than a continuously varying intensity of light from the laser, although analog implementations are possible (see blow). Therefore, noise amplitudes smaller than half the received signal strength will not cause the inverter to change state, and will not seriously corrupt the measurement. However, the noise level present during transitions does have an effect on the accuracy. If noise changes the level of the signal as a transition begins, the time at which the signal crosses zero and the comparator switches will be affected. The faster the transitions can be made, the less effect the noise has. High-speed circuitry such as that used in fiberoptic communications can make transitions in less than 1 nanosecond.

Systematic errors in distance measurements are introduced by the electronics in response to variations in the frequency of oscillation, the amplitude of the received signal, and the temperature of the components. All of these variables can be measured while the device is in operation and compensated for with a calibration table. This compensation would typically be done in software as adjustments to the system's output value.

The binary nature of the operation of the invention raises the possibility that random noise could introduce an additional transition into the recirculating waveform, and such an extra transition could persist. This would cause the transition counter in the measurement circuitry to count three or more times faster than it should, leading to an incorrect distance measurement. This has not been observed in the data collected from the present implementation, as demonstrated in FIG. 5. FIG. 5 is a graphical illustration of the measurements taken using the rangefinder of FIG. 1 when it is set up about 700 millimeters from a wall and about 14,000 measurements taken, where the smooth nature of the distribution and the lack of outliers and the data sample demonstrates the reliability of the measurement system. Even if the problem of extra transitions should manifest, it could be eliminated by clearing the oscillating waveform by holding the output of the laser at one level for a fixed time, and then forcing a first transition to begin the measurement.

ALTERNATE IMPLEMENTATIONS AN MODIFICATIONS

The description given above represents the preferred embodiment of the invention. Modifications and alternate implementations may be effected without affecting the principles of operation of the invention or the scope of the claims below.

It is not necessary to use laser light; ordinary light that can be modulated in intensity can be used. Any frequency of electromagnetic radiation would work, whether above, in or below the visible portion of the spectrum, such as microwaves or radiowaves. Ultrasound may also be used.

The prototype uses binary states for the light beam; it is either on or off, where on or off may be indicated by two signals of different amplitudes or two signals of the opposite polarity. However, a sinusoidal continuously varying waveform could also be used, and might be more appropriate for some applications. This was tested and found to work in a modified version of the existing prototype. Gain control circuitry is necessary in such a system to hold the loop gain at −1 for varying received signal strengths.

In order to obtain the maximum range, the return signal may be amplified optically by use of an optical amplifier such as the fiberoptic amplifier sold by Bell Laboratories before being converted to an electrical signal.

FIG. 4 is a schematic diagram of a rangefinder and the detection and triggering circuit showing the optical and electrical signal paths. The embodiment of FIG. 4 differs from that of FIG. 2 in that, instead of providing binary states for the light beam, source 35 generates an outgoing pulse 36. The returning pulse is sensed by photodiode 8 and detected by pulse detector 38. Detector 38 then causes the pulse driver 39 to apply a signal to source 35 to generate another outgoing pulse. Pulse detector 38 and pulse driver 39 and source 35 are known to those skilled in the art.

In the embodiments of FIGS. 2 and 4, the source (1, 35) is close to detector photodiode 8, so that the photodiode detects a return beam or pulse which is reflected off of an object in order to measure the distance between the detector/source and the object. Instead of collocating the source and detector together, it is possible to place the detector at the object to be measured and a source at the rangefinder so that the detector would detect the pulse or beam from the source directly in order to measure the distance between the rangefinder and the object.

This system has been demonstrated with reflections from several types of ordinary objects. It can also be used with retroreflective targets, which could extend the useful range to many kilometers. Retroreflectors are often used in surveying to make range measurements at Km-plus ranges. Surveying instruments are generally phase measurement based.

SYSTEM PERFORMANCE AND TEST RESULTS

The performance of the prototype has been tested to some extent. A variety of range measurements has been made that illustrates the different capabilities of the system. Work is currently underway on a second prototype, with significant performance improvements expected.

The prototype will measure distances from 0 to 10 meters, with a resolution of 1.22 millimeters at a sample rate of 3,662 Hz. The sample rate may be increased with a proportional reduction in resolution, up to a maximum of 7.5 MHz with a resolution of 2.5 meters.

The first test done was to measure the effect of random noise on the measurements as illustrated in FIG. 5. The device was set up about 700 mm from a wall and 31,680 measurements were taken. The standard deviation was 0.453 mm, with a Gaussian distribution. A histogram of the data is shown in FIG. 5. The smooth nature of the distribution and the lack of outliers in the data sample demonstrates the reliability of the measurement system.

The next test illustrated in FIG. 6 was done by aiming the system at a spinning fan, and recording the range measurements as the blades interrupted the light beam. The attached graph shows the profiles of the blades and the flat background behind them. This demonstrates the dynamic response of the device and its ability to make range measurements on moving objects.

In another test illustrated in FIG. 7, the prototype was mounted on a mobile platform and rotated through a full circle, taking measurements of the laboratory around it. A plot of the data, attached, shows the profile of the building and objects inside. This demonstrates the ability of the device to obtain variety of angles of incidence.

While the invention has been described by reference to various embodiments, it will be understood that various modifications and changes may be made without departing from the scope of the invention which is to be limited only by the appended claims.

What is claimed is:

1. A system for measuring a distance to a remote object comprising:
    a source for transmitting an optical measurement signal beam to the object;
    a detector for generating an output signal in response to detection of a reflection of said signal beam from the object, said detector output signal being related to an amplitude of said detected reflection;
    an element responsive to the detector output signal for causing said source to continually transmit the measurement signal beam at a first amplitude while said reflection is detected as being at a second amplitude, and for causing said source to continually transmit the measurement signal beam at said second amplitude while said reflection is detected as being at said first amplitude; and
    measurement means for measuring a frequency of modulation of said signal beam, said frequency being indicative of a distance from said source to the object.

2. The system of claim 1 wherein said first amplitude is greater than zero and said second amplitude is zero.

3. The system of claim 1 wherein said source comprises a laser diode which emits light at either of two power levels in response to an electrical input from said element, said light being collimated by a lens, thereby forming the optical measurement signal beam.

4. The system of claim 1 wherein said detector comprises a photodiode.

5. The system of claim 1 further comprising: an amplifier for amplifying said detector output signal, and
    an inverter for inverting said detector output signal, thereby producing an inverted, amplified electrical signal.

6. The system of claim 5 wherein said inverted, amplified electrical signal is utilized by said element to drive said source.

7. The system of claim 1 wherein said measurement means comprises:
   a divider which reduces multiple cycles of modulation to a single interval, and
   a timer for measuring a duration of said interval.

8. The system of claim 1 wherein said detector is collocated with said source such that said signal beam is concentric with and of lesser diameter than the reflection collected by said detector.

9. A system for measuring a distance to a remote object comprising:
   a source for transmitting an optical measurement signal beam to the object;
   a detector for generating an output signal in response to detection of a reflection of said signal beam from the object, said detector output signal being related to an amplitude of said detected reflection;
   an element responsive to the detector output signal for causing said source to continually transmit the measurement signal beam at an amplitude which is inversely related to the amplitude of said detected reflection such that while the amplitude of said detected reflection is a quantitative amount above a threshold level, said element causes said source to continuously transmit the signal beam at an amplitude which is said quantitative amount below said threshold level; and while the amplitude of said detected reflection is a quantitative amount below said threshold level, said element causes said source to continuously transmit the signal beam at an amplitude which is said quantitative amount above said threshold level; and
   measurement means for measuring a frequency of modulation of said signal beam, said frequency being indicative of a distance from said source to the object.

10. The system of claim 9 wherein said threshold level is an average level of the amplitude of said detected reflection.

11. The system of claim 10 wherein said source comprises a laser diode which emits light in response to an electrical input from said element, said light being collimated by a lens, thereby forming the optical measurement signal beam.

12. The system of claim 10 wherein said detector comprises a photodiode.

13. The system of claim 10 further comprising:
   an amplifier for amplifying said detector output signal, and
   an inverting gain element for inverting said detector output signal,
   thereby producing an inverted, amplified electrical signal.

14. The system of claim 13 wherein said inverted, amplified electrical signal is utilized by said element to drive said source.

15. The system of claim 10 wherein said measurement means comprises:
   a divider which reduces multiple cycles of modulation to a single interval, and
   a timer for measuring a duration of said interval.

16. The system of claim 10 wherein said detector is collocated with said source such that said signal beam is concentric with and of lesser diameter than the reflection collected by said detector.

17. A method for measuring a distance to a remote object comprising the steps of:
   (a) transmitting an optical measurement signal beam from a source to the object;
   (b) detecting a reflection of said signal beam from the object;
   (c) modulating said signal beam in response to said detected reflection, said modulating step comprising the step of causing said source to continually transmit the measurement signal beam at an amplitude which is inversely related to the amplitude of said detected reflection such that while the amplitude of said detected reflection is a quantitative amount above a threshold level, said element causes said source to continuously transmit the signal beam at an amplitude which is said quantitative amount below said threshold level; and while the amplitude of said detected reflection is a quantitative amount below said threshold level, said element causes said source to continuously transmit the signal beam at an amplitude which is said quantitative amount above said threshold level; and
   (d) measuring a frequency of modulation of said signal beam, said frequency being indicative of a distance from said source to the object.

18. The method of claim 17 wherein said threshold level is an average level of the amplitude of said detected reflection.

19. A method for measuring a distance to a remote object comprising the steps of:
   (a) transmitting an optical measurement signal beam from a source to the object;
   (b) detecting a reflection of said signal beam from the object;
   (c) modulating said signal beam in response to said detected reflection, said modulating step comprising the steps of:
      (i) causing said source to continually transmit the measurement signal beam at a first amplitude while the amplitude of said detected reflection is at a second amplitude, and
      (ii) causing said source to continually transmit the measurement signal beam at said second amplitude while the amplitude of said detected reflection is at said first amplitude; and
   (d) measuring a frequency of modulation of said signal beam, said frequency being indicative of a distance from said source to the object.

20. The method of claim 19 wherein said first amplitude is greater zero and said second amplitude is zero.

21. A system for deflecting an optical measurement signal beam in two dimensions and for collecting a reflection of said beam from a remote object, said system comprising:
   a first prism means for deflecting, via a refraction angle, said beam and said reflection;
   a rotating means for rotating said first prism about an axis;
   a second prism means for deflecting said beams and said reflection, said second prism means comprising a triangular prism having a mirrored diagonal surface which deflects said beam and said reflection through a 360 degree field of view lying in a plane perpendicular to said axis of rotation, which together with the deflection of the beams and reflection by said first prism means enables a field of view encompassing 360 degrees of azimuth and a number of degrees of elevation equal to twice the refraction angle of said first prism;

a second rotating means for rotating said second prism about said axis;

a first control means for rotating said first prism through a first angle at a first rate of speed; and a second control means for rotating said second prism through a second angle at a second rate of speed, thereby enabling positioning of the transmitted signal beam to any desired position or through any desired pattern within a field of view encompassing 360 degrees of azimuth and said number of degrees of elevation.

22. The system of claim 21 wherein said first prism means is a triangular prism, and said refraction angle is approximately 26 degrees, thereby enabling positioning of the transmitted beam to any desired position or through any desired pattern within a field of view encompassing 360 degrees of azimuth and 52 degrees of elevation.

23. A method for deflecting an optical measurement signal beam in two dimensions and for collecting a reflection of said beam from a remote object, said method comprising the steps of:

deflecting said beam and said reflection through a refraction angle of a first prism;

rotating said first prism about an axis, said first prism being rotated through a first angle at a first rate of speed;

deflecting said beam and said reflection through a second prism, said second prism being a triangular prism having a mirrored diagonal surface which deflects said beam and said reflection (through a 360 degree field of view lying in a plane perpendicular to said axis of rotation, which together with the deflection of the beam and reflection by said first prism enables a field of view encompassing 360 degrees of azimuth and a number of degrees of elevation equal to twice the refraction angle of said first prism;

rotating said second prism about said axis, said second prism being rotated through a second angle at a second rate of speed, thereby enabling positioning of the signal beam to any desired position or through any desired pattern within a field of view encompassing 360 degrees of azimuth and said number of degrees of elevation.

24. The method of claim 23 wherein said first prism means is a triangular prism, and said refraction angle is approximately 26 degrees, thereby enabling positioning of the transmitted beam to any desired position or through any desired pattern within a field of view encompassing 360 degrees of azimuth and 52 degrees of elevation.

* * * * *

UNITED STATES PATENT AND TRADEMARK OFFICE
CERTIFICATE OF CORRECTION

PATENT NO. : 5,309,212
DATED : May 3, 1994
INVENTOR(S) : R. Robert Clark

It is certified that error appears in the above-indentified patent and that said Letters Patent is hereby corrected as shown below:

In Column 11, lines 43, 48, 50, 60 and 65, replace:
"The system of claim 10" with
--The system of claim 9--

In Column 12, lines 60 and 66, replace "beams" with --beam--

In Column 14, line 7, delete "("

In Column 12, line 51, replace the phrase "greater zero" with the phrase --greater than zero--

Signed and Sealed this

Twenty-ninth Day of November, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,309,212
DATED : May 3, 1994
INVENTOR(S) : R. Robert Clark

It is certified that error appears in the above-indentified patent and that said Letters Patent is hereby corrected as shown below:

On title page, item [73], change Assignee to read:
—Yaskawa Electric Corporation, Tokyo, Japan and R. Robert Clark, Cupertino, Calif.—

Signed and Sealed this

Thirty-first Day of January, 1995

Attest:

BRUCE LEHMAN

*Attesting Officer*   Commissioner of Patents and Trademarks